(12) United States Patent
Wolf et al.

(10) Patent No.: US 10,030,100 B2
(45) Date of Patent: Jul. 24, 2018

(54) METHOD FOR PRODUCING FORMALDEHYDE-ALKYL CARBONATE-COPOLYMERS

(71) Applicant: Covestro Deutschland AG, Leverkusen (DE)

(72) Inventors: Aurel Wolf, Wulfrath (DE); Ilja Peckermann, Cologne (DE); Jens Langanke, Mechernich (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 0 days.

(21) Appl. No.: 15/103,329

(22) PCT Filed: Dec. 5, 2014

(86) PCT No.: PCT/EP2014/076707
§ 371 (c)(1),
(2) Date: Jun. 10, 2016

(87) PCT Pub. No.: WO2015/086452
PCT Pub. Date: Jun. 18, 2015

(65) Prior Publication Data
US 2016/0311974 A1    Oct. 27, 2016

(30) Foreign Application Priority Data
Dec. 10, 2013 (EP) .................... 13196346

(51) Int. Cl.
| | | |
|---|---|---|
| *C08G 18/00* | (2006.01) |
| *C08G 59/00* | (2006.01) |
| *C08G 64/02* | (2006.01) |
| *C08G 2/00* | (2006.01) |
| *C08L 59/00* | (2006.01) |
| *C08G 18/08* | (2006.01) |
| *C08G 18/44* | (2006.01) |
| *C08G 18/72* | (2006.01) |

(52) U.S. Cl.
CPC .......... *C08G 64/0208* (2013.01); *C08G 2/00* (2013.01); *C08G 18/08* (2013.01); *C08G 18/44* (2013.01); *C08G 18/72* (2013.01); *C08L 59/00* (2013.01)

(58) Field of Classification Search
None
See application file for complete search history.

(56) References Cited

U.S. PATENT DOCUMENTS 3,012,990 A    12/1961  Kray et al.
3,272,780 A *  9/1966  May ................... C08G 2/20
                                              528/232

FOREIGN PATENT DOCUMENTS

DE   2055045 A1    5/1972
GB    926903   *   1/1972

OTHER PUBLICATIONS

Exhibit A: Reuss, G. et al.; "Ullmann's Encyclopedia of Industrial Chemistry"; Chapter titled "Formaldehyde"; (2012); Wiley-Verlag GmbH & Co KGaA, Weinheim; vol. 15; pp. 735-768.

* cited by examiner

*Primary Examiner* — Ana L Woodward
(74) *Attorney, Agent, or Firm* — N. Denise Brown

(57) ABSTRACT

The present invention relates to a method for producing formaldehyde-alkylene carbonate copolymers comprising the step of reacting trimeric, oligomeric and/or polymeric formaldehyde with an alkylene carbonate in the presence of a catalyst. Said invention further relates to copolymers obtainable by this method and the reaction products thereof with polyisocyanates.

16 Claims, No Drawings

METHOD FOR PRODUCING FORMALDEHYDE-ALKYL CARBONATE-COPOLYMERS

CROSS-REFERENCE TO RELATED APPLICATIONS

This application is a National Phase application to PCT/EP2014/076707, filed Dec. 5, 2014 and European Application No.: 13196346.4 filed Dec. 10, 2013.

FIELD OF THE INVENTION

The present invention, relates to a method for producing formaldehyde-alkylene carbonate copolymers comprising the step of reacting trimeric, oligomeric and/or polymeric formaldehyde with an alkylene carbonate in the presence of a catalyst. Said invention further relates to copolymers obtainable by this method and the reaction products thereof with polyisocyanates.

Formaldehyde-alkylene carbonate copolymers are therefore of interest in particular because incorporation of carbon dioxide units into the polymer chain allows freely available and otherwise climate-damaging starting materials to be employed. The objective of the developments in this field is the development of an economic production process achieving the highest possible carbon dioxide content in the polymer.

BACKGROUND

U.S. Pat. No. 3,012,990 discloses a co-polymerization of cyclic ethylene carbonate ($CO_2$-source) with 1,3,5-trioxane (formaldehyde source) in the presence of boron trifluoride catalysts.

Militskova et al. (Plasticheskie Massy, 1973, 3, 9, Polymerization and copolymerization of formaldehyde in the presence of alkylene carbonates) describe the $BF_3$ etherate-catalyzed copolymerization of trioxane in cyclic propylene carbonate. However at elevated temperatures (80° C. to 90° C.) and elevated catalyst concentrations the $CO_2$ escapes from the propylene carbonate so that the copolymer product no longer contains carbonate. This is evidenced by the absence of corresponding signals in the IR spectrum.

DE 2055045 A1 relates to a method for producing high molecular weight copolymers of trioxane with ethylene oxide derivatives. A characteristic feature of the method described therein is that the copolymerization is carried out in the presence of alkylene carbonates, in particular an ethylene carbonate or propylene carbonate.

SUMMARY

The present invention has for its object the provision of an improved method for producing formaldehyde-alkylene carbonate copolymers where a high proportion of $CO_2$ is incorporated into the copolymer.

This object is achieved in accordance with the invention by a method for producing formaldehyde-alkylene carbonate copolymers comprising the step of reacting trimeric, oligomeric and/or polymeric formaldehyde with an alkylene carbonate in the presence of a catalyst, wherein the reaction is carried out under pressurization with $CO_2$.

It has now been found that, surprisingly, the method according to the invention makes it possible to obtain copolymers whose reflection in the IR spectrum is reduced in a region characteristic of carbonyl bands (1735 cm$^{-1}$±5 cm$^{-1}$). This can be attributed to a high proportion of incorporated $CO_2$.

Pressurization with $CO_2$ which in the method according to the invention is to be understood as meaning a $CO_2$ partial pressure of >1 bar may be effected in continuous or batchwise fashion. Thus, after establishment of the intended pressure an autoclave reactor for example may be operated with an open or closed $CO_2$ bottle or else with controlled $CO_2$ addition by means of a mass flow controller.

The formaldehyde source may be trimeric, oligomeric and/or polymeric formaldehyde. The reaction with the alkylene carbonate takes place in the presence of the catalyst. The alkylene carbonate is preferably a cyclic alkylene carbonate. Alkylene carbonates may formally be derived from the reaction of alkylene oxides with $CO_2$. Examples thereof are ethylene carbonate and propylene carbonate.

The molar ratios of the employed formaldehyde to the alkylene carbonate are preferably in a range from 1:10 to 10:1, more preferably 1:6 to 6:1 and particularly preferably 1:4 to 4:1.

The amount of the catalyst based on alkylene carbonate is preferably 0.01 mol % to 10 mol %, more preferably 0.05 mol % to 5 mol % and particularly preferably 0.1 mol % to 2 mol %.

DETAILED DESCRIPTION

The present invention will now be described in connection with further aspects and embodiments. Said aspects and embodiments may be combined with one another as desired unless the opposite is clear from the context.

In one embodiment of the method according to the invention the $CO_2$ partial pressure is ≥15 bar, preferably ≥20 bar and more preferably ≥25 bar. It is possible for the $CO_2$ partial pressure to be ≥15 bar to ≤100 bar. This partial pressure is favorably ≥20 bar to ≤85 bar and more preferably ≥20 bar bis ≤75 bar. It is preferable when the $CO_2$ partial pressure corresponds to the overall pressure in the gas phase of the reaction space or the proportion of the overall pressure attributable to the $CO_2$ partial pressure is 90% or more. This may be the case when low-boiling or gas-eliminating reaction components are employed. It is also possible to use a gas mixture to establish a higher overall pressure in the gas phase of the reaction space provided that the $CO_2$ partial pressure is not below the inventive lower limit.

In a further embodiment of the method according to the invention the catalyst comprises a metal M in an oxidation state of ≥III, wherein M is selected from the group of B, Sc, Y, Ti, Zr, Hf and/or a lanthanide; and/or the catalyst comprises tin in an oxidation state of ≥II. "Lanthanides" in the context of the present invention are the metals lanthanum, cerium, praseodymium, neodymium, promethium, samarium, europium, gadolinium, terbium, dysprosium, holmium, erbium, thulium, ytterbium and lutetium.

In a further embodiment of the method according to the invention 1,3,5-trioxane is employed.

In a further embodiment of the method according to the invention the alkylene carbonate conforms to the following formula:

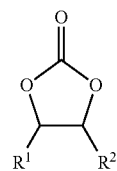

wherein R¹ and R² are independently of one another selected from the group of hydrogen, linear $C_1$- to $C_{16}$-alkyl, $C_3$- to $C_{16}$-cycloalkyl, $C_2$- to $C_{16}$-alkenyl and/or aryl.

The term "alkyl" in the context of this invention encompasses acyclic saturated or unsaturated aliphatic hydrocarbon radicals, each of which may be branched or unbranched and also unsubstituted or mono- or polysubstituted. It is preferable when "ally" is selected from the group comprising methyl, ethyl, n-propyl, 2-propyl, n-butyl, isobutyl, sec-butyl, tert-butyl, n-pentyl, isopentyl, neopentyl, n-hexyl, n-heptyl, n-octyl, n-nonyl, n-decyl.

For the purposes of this invention, the term "cycloalkyl" denotes cyclic aliphatic (cycloaliphatic) hydrocarbons, wherein the hydrocarbons may be saturated or unsaturated (but not aromatic), unsubstituted or mono- or polysubstituted. The bonding of the cycloalkyl to the respective superordinate general structure may be effected via any desired and possible ring member of the cycloalkyl radical. The cycloalkyl radicals may also be fused to further saturated, (partially) unsaturated, (hetero)cyclic, aromatic or heteroaromatic ring systems, i.e. to cycloalkyl, heterocyclyl, aryl or heteroaryl, which in turn may be unsubstituted or mono- or polysubstituted. The cycloalkyl radicals may furthermore be singly or multiply bridged as, for example, its the case of adamantyl, bicyclo[2.2.1]heptyl or bicyclo[2.2.2]octyl. Cycloalkyl is preferably selected from the group comprising cyclopropyl, cyclobutyl, cyclopentyl, cyclohexyl, cycloheptyl, cyclooctyl, cyclononyl, cyclodecyl, adamantyl,

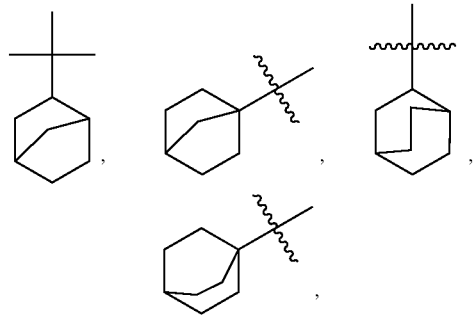

cyclopentenyl, cyclohexenyl, cyclolheptenyl and cyclooctenyl.

Alkenyl substituents are preferably selected from the group comprising ethenyl (vinyl), ethynyl, propenyl (—CH₂CH═CH₂, —CH═CH—CH₃, —C(═CH₂)—CH₃).

In the context of this invention, the term "aryl" denotes aromatic hydrocarbons, inter alia phenyls and naphthyls. Each aryl radical may be unsubstituted or mono- or polysubstituted, wherein the aryl substituents may be identical or different and in any desired and possible position on the aryl. The bonding of the aryl to the superordinate general structure may be effected via any desired and possible ring member of the aryl radical. The aryl radicals may also be fused to further saturated, (partially) unsaturated, (hetero)cyclic, aromatic or heteroaromatic ring systems, i.e. to cycloalkyl, heterocyclyl, aryl or heteroaryl, which in turn may be unsubstituted or mono- or polysubstituted. Examples of fused aryl radicals are benzodioxolanyl and benzodioxanyl. Aryl is preferably selected from the group comprising phenyl, 1-naphthyl and 2-naphthyl, each of which may be unsubstituted or mono- or polysubstituted. A particularly preferred aryl is phenyl, in unsubstituted or mono- or polysubstituted form.

It is preferable here that the alkylene carbonate is ethylene carbonate, propylene carbonate and/or butylene carbonate.

In a further embodiment of the method according to the invention the catalyst is selected front the group of $BF_3 \cdot OEt_2$, $TiCl_4$, $ZrCl_4$, $YbCl_3$ and/or $SnCl_2$.

In a farther embodiment of the method according to the invention, the reaction is carried out at a temperature of ≥80° C. to ≤150° C. The temperature is preferably ≥90° C. to ≤145+ C., more preferably ≥100° C. to ≤140° C.

In a further embodiment of the method according to the invention said method further comprises the step of reacting the obtained copolymer with an OH-reactive compound. In this way, polymers may be stabilized with obtained end groups for example. This is also referred to as "endcapping". This procedure also allows incorporation of branching points and further chain extension of the polymer.

In a further embodiment of the method according to the invention the OH-reactive compound is selected from the group of anhydrides and/or of alkylene oxides. Examples of suitable anhydrides are acetic anhydride, succinic anhydride, maleic anhydride, phthalic anhydride, 1,2-cyclohexanedicarboxylic anhydride, diphenic anhydride, tetrahydrophthalic anhydride, methylhetrahydrophthalic anhydride, norbornenedioic anhydride and the chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride dimethylmaleic anhydride, allylnorbornenedioic anhydride, 3-methylfuran-2,5-dione, 3-methyldihydrofuran-2,5-dione, dihydro-2H-pyran-2,6(3H)-dione, 1,4-dioxane-2,6-dione, 2H-pyran-2,4,6(3H, 5H)-trione, 3-ethyldihydrofuran-2,5-dione, 3-methoxydihydrofuran-2,5-dione, 3-(prop-2-en-1-yl)dihydrofuran-2,5-dione, N-(2,5-dioxotetrahydrofuran-3-yl)formamide and 3[(2E)-but-2-en-1-yl]dihydrofuran-2,5-dione. Succinic anhydride, maleic anhydride and phthalic anhydride are particularly preferred.

The alkylene oxides are preferably alkylene oxides having 2-4 carbon atoms. They may for example be one or more compounds selected from the group of styrene oxide, ethylene oxide, propylene oxide, 2,3-butene oxide and/or 2-methyl-1-propene oxide (isobutene oxide). It is further possible that alkylene oxides having more than one epoxy group may be employed.

In a further embodiment of the method according to the invention, the OH-reactive compound is selected from the group of polyisocyanates. Polyisocyanates suitable in accordance with the invention include, for example, 1,4-butylene diisocyanate, 1,6-hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof with any desired isomer content, 1,4-cyclohexylene diisocyanate 4-isocyanatomethyl-1,8-octane diisocyanate (nonane triisocyanate), 1,4-phenylene diisocyanate, 2,4- and/or 2,6-tolylene diisocyanate, 1,5-naphthylene diisocyanate, 2,2'- and/or 2,4'- and/or 4,4'-diphenylmethane diisocyanate, 1,3- and/or 1,4-bis(2-isocyanatoprop-2-yl)benzene (TMXDI), 1,3-bis(isocyanatomethyl)benzene (XDI), alkyl 2,6-diisocyanatohexanoates (lysine diisocyanates) having alkyl groups having 1 to 8 carbon atoms and mixtures thereof. Uretdione-, isocyanurate-, biuret-, iminooxadiaxinedioneor oxadiazinetrione-structure-containing compounds based on the cited diisocyanates are also suitable building blocks.

Suitable isocyanate components are especially the industrially readily obtainable polyisocyanates, for example 2,4- and 2,6-tolylene diisocyanate and any desired mixtures of these isomers ("TDI"); polyphenyl polymethylene polyisocyanates as prepared by aniline-formaldehyde condensation and subsequent phosgenation ("crude MDI"), and polyisocyanates having carbodiimide groups, urethane groups, allophanate groups, isocyanurate groups, urea groups or biuret groups ("modified polyisocyanates"), in particular those modified polyisocyanates which derive from 2,4- and/or 2,6-tolylene diisocyanate or from 4,4'- and/or 2,4'-diphenylmethane diisocyanate. The polyisocyanate is preferably at least one compound selected from the group consisting of 2,4- and 2,6-tolylene diisocyanate, 4,4'- and 2,4'- and 2,2'-diphenylmethane diisocyanate and polyphenyl polymethylene polyisocyanate ("polycyclic MDI").

In a further embodiment of the method according to the invention the catalyst is added only once a predetermined temperature has been attained. The advantage of this procedure is that an undesired Lewis acid polymerization of the formaldehyde to afford polyoxymethylene (POM) can be prevented. The catalyst is preferably added just before or upon attainment of the predetermined reaction temperature. Accordingly this may be effected at ≤90%, ≤80% or ≤70% of the predetermined reaction temperature. For example, catalyst addition may be effected on attainment of a temperature of 140° C. or, in the ease of $BF_3$, of 120° C.

A further aspect of the present invention is a formaldehyde-alkylene carbonate copolymer obtainable by a method according to the invention and exhibiting a reflection in the infrared spectrum at 1735 $cm^{-1}$±5 $cm^{-1}$ of ≤86%. This reflection is preferably ≤80% and more preferably ≤75%.

In one embodiment of the copolymer according to the invention said copolymer has a $CO_2$ content of ≥3.0 wt % to ≤33 wt %. It is particularly preferable when the $CO_2$ content of the copolymers according to the invention is between ≥3.5 wt % and ≤25 wt %.

The present invention finally also relates to a polyurethane polymer obtainable by the abovementioned method according to the invention.

The invention is more particularly elucidated by reference to the examples which fellow but without any intention to limit the invention thereto.

EXAMPLES

The following examples describe the production of polymers from cyclic propylene carbonate and 1,3,5-trioxane. The polymers formed was analyzed for $CO_2$ incorporation by IR spectroscopy (Nicolet Magna FT-IR 550 spectrometer, acquisition software: OMNIC Version 7.3, method as per manufacturer specifications), the signal for the linear carbonate group at ~1735 $cm^{-1}$ (reflection) being used as a measure of incorporation.

The $CO_2$ incorporation was quantified via a reference measurement with a polyether carbonate polyol having a known $CO_2$ content. This reference polyol had a $CO_2$ content of 12 wt % determined by NMR spectroscopy. Details are reported inter alia in WO 2012/049162 A1, the entirety of which is hereby incorporated by reference.

Example 1: $BF_3 \cdot OEt_2$ Catalyst at 37 Bar $CO_2$

A 300 mL pressure reactor fitted with a gas is metering device was initially charged in a 1:1 ratio with 35.0 g (0.39 mol) of 1,3,5-trioxane (commercial-grade, Acros) and 39.7 g (0.39 mol) of cyclic propylene carbonate (commercial-grade, Merck), said carbonate having previously been stored over a 14 Å molecular sieve, and the reactor was sealed. The stirrer speed was then set to 500 rpm and the reactor was inertized by subsequent threefold evacuation, and pressurization with $N_2$ (about 3 bar). At 120° C. and 36 bar of $CO_2$ pressure the polymerization was started by addition to the reaction mixture of 1.3 mmol of $BF_3.OEt_2$ as catalyst. A T of 140° C. and a pressure of 36 bar of $CO_2$ were subsequently established. After the appropriate reaction time of 60 min the reactor was cooled to room temperature.

The obtained colorless solid was washed three times with water and once with diethyl ether and dried under reduced pressure (50 mbar) at 23° C.

This gave the reflection and $CO_2$ incorporation into the polymer reported in table 1.

Example 2: $TiCl_4$ Catalyst at 48 Bar $CO_2$

An experiment as per example 1 was carried out wherein 70.0 g (0.78 mol) of 1,3,5-trioxane, 76.4 g (0.75 mol) of cyclic propylene carbonate and 1.3 mmol (eq.~0.1 mol-%) of $TiCl_4$ as catalyst were employed. Addition was effected at 140° C. and a pressure of 48 bar of $CO_2$ was established. This gave the reflection and $CO_2$ incorporation into the polymer reported in table 1.

Example 3: $TiCl_4$ Catalyst at 11 Bar $CO_2$

An experiment as per example 2 was carried out, wherein $TiCl_4$ was employed as catalyst and a pressure of 11 bar of $CO_2$ was established. This gave the reflection and $CO_2$ incorporation into the polymer reported in table 1.

Example 4: $ZiCl_4$ Catalyst at 40 Bar $CO_2$

An experiment as per example 2 was carried out with the exception that the temperature during addition was 125° C. $ZrCl_4$ was employed as catalyst and a pressure of 40 bar of $CO_2$ was established. This gave the reflection and $CO_2$ incorporation into the polymer reported in table 1.

An experiment as per example 2 was carried out, wherein $YbCl_3$ was employed as catalyst and a pressure of 35 bar of $CO_2$ was established. Addition was effected at 140° C. This gave the reflection and $CO_2$ incorporation into the polymer reported in table 1.

Example 6 (Comparative Example): $TiCl_4$ Catalyst at 41 Bar $N_2$

An experiment as per example 1 was carried out, wherein $TiCl_4$ was employed as catalyst and a pressure of 41 bar of $N_2$ was established. Addition was effected at 140° C. This gave the reflection and $CO_2$ incorporation into the polymer reported in table 1.

TABLE 1

| Ex. no. | Cat. | Time [min] | Temp. [° C.] | Pressure [bar] | [Reflection %] at 1735 $cm^{-1}$ | Yield [%] | $CO_2$ [wt %] |
|---|---|---|---|---|---|---|---|
| 1 | $BF_3 \cdot OEt_2$ | 60 | 140 | 36/$CO_2$ | 77.2 | 23.28 | 5.1 |
| 2 | $TiCl_4$ | 60 | 140 | 48/$CO_2$ | 71.4 | 4.77 | 6.4 |
| 3 | $TiCl_4$ | 60 | 140 | 11/$CO_2$ | 90 | 5.13 | 2.2 |
| 4 | $ZrCl_4$ | 60 | 140 | 40/$CO_2$ | 72.3 | 11.2 | 6.2 |

TABLE 1-continued

| Ex. no. | Cat. | Time [min] | Temp. [° C.] | Pressure [bar] | [Reflection %] at 1735 cm⁻¹ | Yield [%] | CO₂ [wt %] |
|---|---|---|---|---|---|---|---|
| 5 | YbCl₃ | 60 | 140 | 35/CO₂ | 85.2 | 6.2 | 3.3 |
| 6 | TiCl₄ | 60 | 140 | 41/N₂ | 93.2 | 22.97 | 1.5 |

Example 7: SnCl₂ Catalyst at 1 Bar CO₂

A 300 mL pressure reactor fitted with a gas metering device was initially charged in a 1:1 ratio with 35.0 g (0.39 mol) of 1,3,5-trioxane (commercial-grade, Acros) and 39.7 g (0.39 mol) of cyclic propylene carbonate (commercial-grade, Aldrich), said carbonate having previously been stored over a 14 Å molecular sieve, together with 2.5 g (0.0132 mol) of SnCl₂ and the reactor was sealed. The stirrer speed was then set to 500 rpm and the reactor was inertized by subsequent threefold evacuation and pressurization with N₂ (about 3 bar). A pressure of 1 bar of CO₂ was subsequently established by evacuation and pressurization and the reactor was heated to T=140° C. After the appropriate reaction time of 60 min said reactor was cooled to room temperature. An increase in internal pressure up to about 8 bar was observed.

The obtained colorless solid was washed three times with wafer and once with diethyl ether and dried under reduced pressure (50 mbar) at 23° C. This gave the reflection and CO₂ incorporation into the polymer reported in table 2.

Example 8: SnCl₂ Catalyst at 53 Bar CO₂

An experiment as per example 7 was carried out, wherein a pressure of 53 bar of CO₂ was established. This gave the reflection and CO₂ incorporation into the polymer reported in table 2.

Example 9 (Comparative Example): SnCl₂ Catalyst at 1 Bar N₂

An experiment as per example was carried out, wherein a pressure of 1 bar of was established. A constant increase in internal pressure up to about 10 bar was observed. This gave the reflection and CO₂ incorporation into the polymer reported in table 2.

Example 10 (Comparative Example): SnCl₂ Catalyst at 35 Bar N₂

An experiment as per example 7 was carried out, wherein a pressure of 35 bar of N₂ was established. This gave the reflection and CO₂ incorporation into the polymer reported in table 2.

Example 11: SnCl₂ Catalyst at 35 Bar CO₂

An experiment as per example 7 was carried out, wherein a pressure of 35 bar of CO₂ was established. This gave the reflection and CO₂ incorporation into the polymer reported in table 2.

Example 12: SnCl₂ Catalyst at 15 Bar CO₂

An experiment as per example 7 was carried out, wherein a pressure of 15 bar of CO₂ was established. This gave the reflection and CO₂ incorporation into the polymer reported in table 2.

TABLE 2

| Ex. no. | Cat. | Time [min] | Temp. [° C.] | Pressure [bar] | [Reflection %] at 1735 cm⁻¹ | Yield [%] | CO₂ [wt %] |
|---|---|---|---|---|---|---|---|
| 7 | SnCl₂ | 60 | 140 | 1/CO₂ | 85.6 | 12.3 | 3.2 |
| 8 | SnCl₂ | 60 | 140 | 53/CO₂ | 69.4 | 14.88 | 6.8 |
| 9 | SnCl₂ | 60 | 140 | 1/N₂ | 90.3 | 7.2 | 2.2 |
| 10 | SnCl₂ | 60 | 140 | 35/N₂ | 79.2 | 13.47 | 4.6 |
| 11 | SnCl₂ | 60 | 140 | 35/CO₂ | 76.2 | 15.3 | 5.3 |
| 12 | SnCl₂ | 60 | 140 | 15/CO₂ | 80.4 (at 1730 cm⁻¹) | 8.62 | 4.4 |

The invention claimed is:

1. A method for producing formaldehyde-alkylene carbonate copolymers comprising the step of reacting trimeric, oligomeric and/or polymeric formaldehyde with an alkylene carbonate in the presence of a catalyst,
    wherein
    the reaction is carried out under pressurization with CO₂.

2. The method as claimed in claim 1, wherein the pressurization with CO₂ is carried out such that a CO₂ partial pressure of ≥15 bar is attained.

3. The method as claimed in claim 1, wherein:
    the catalyst comprises a metal M in an, oxidation state of ≥III, wherein M is selected from the consisting of group of B, Sc, Y, Ti, Zr, Hf and/or a lanthanide;
    and/or
    the catalyst comprises tin in an oxidation state of ≥II.

4. The method as claimed in claim 1, wherein said formaldehyde comprises 1,3,5-trioxane.

5. The method as claimed in claim 1, wherein the alkylene carbonate corresponds to the following formula:

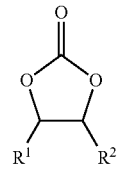

wherein R¹ and R² are independently of one another selected from the group of hydrogen, linear $C_1$- to $C_{16}$-alkyl, $C_3$- to $C_{16}$-cycloalkyl, $C_2$- to $C_{16}$-alkenyl and aryl.

6. The method as claimed in claim 5, wherein the alkylene carbonate is ethylene carbonate, propylene carbonate and/or butylene carbonate.

7. The method as claimed in claim 1, wherein the catalyst comprises one or more of BF₃.OEt₂, TiCl₄, ZrCl₄, YbCl₃ and SnCl₂.

8. The method as claimed in claim 1, wherein the reaction is carried out at a temperature of ≥80° C. to ≤150° C.

9. The method as claimed in claim 8, wherein said catalyst is added only once a predetermined temperature has been attained.

10. The method as claimed in claim 1, further comprising the step of reacting the resultant copolymer with an OH-reactive compound.

11. The method as claimed in claim 10, wherein the OH-reactive compound is selected from the group of anhydrides and/or of alkylene oxides.

12. The method as claimed in claim 10, wherein the OH-reactive compound is selected from the group of polyisocyanates.

13. A formaldehyde-alkylene carbonate copolymer which comprises the reaction product obtained by reacting (i) trimeric, oligomeric and/or polymeric formaldehyde, with (ii) an alkylene carbonate, in the presence of (iii) a catalyst, and (iv) under pressurization with carbon dioxide, wherein the resultant formaldehyde-alkylene carbonate copolymer has a reflection in the infrared spectrum at 1735 $cm^{-1} \pm 5$ $cm^{-1}$ of $\leq 86\%$.

14. A polyurethane polymer obtained by a method as claimed in claim 12.

15. The copolymer as claimed in claim 13, wherein said copolymer has a $CO_2$ content of $\geq 3.0$ wt % to $\leq 33$ wt %.

16. The formaldehyde-alkylene carbonate copolymer of claim 13, wherein (i) said formaldehyde comprises 1,3,5-trioxane, (ii) said alkylene carbonate comprises cyclic propylene carbonate, and (iii) said catalyst comprises one or more of $BF_3.OEt_2$, $TiCl_4$, $ZrCl_4$, $YbCl_3$ and $SnCl_2$.

* * * * *